(12) United States Patent
Yabe et al.

(10) Patent No.: US 12,231,015 B2
(45) Date of Patent: Feb. 18, 2025

(54) ROTATING ELECTRICAL MACHINE

(71) Applicant: Mitsubishi Electric Corporation, Tokyo (JP)

(72) Inventors: Mitoru Yabe, Tokyo (JP); Takayuki Nakao, Tokyo (JP); Toshihiro Matsunaga, Tokyo (JP); Takashi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 228 days.

(21) Appl. No.: 17/800,408

(22) PCT Filed: Apr. 2, 2020

(86) PCT No.: PCT/JP2020/015169
§ 371 (c)(1),
(2) Date: Aug. 17, 2022

(87) PCT Pub. No.: WO2021/199399
PCT Pub. Date: Oct. 7, 2021

(65) Prior Publication Data
US 2023/0099339 A1    Mar. 30, 2023

(51) Int. Cl.
*H02K 5/10* (2006.01)
*H02K 1/12* (2006.01)

(52) U.S. Cl.
CPC ............ *H02K 5/10* (2013.01); *H02K 1/12* (2013.01)

(58) Field of Classification Search
None
See application file for complete search history.

(56) References Cited

U.S. PATENT DOCUMENTS

2005/0282640 A1* 12/2005 Takada .............. F16D 7/022
                                                       464/10
2012/0056501 A1*  3/2012 Minami ............ H02K 5/1732
                                                       310/90

(Continued)

FOREIGN PATENT DOCUMENTS

DE   10 2017 218 534 A1   4/2018
JP        04-058062 U1    5/1992

(Continued)

OTHER PUBLICATIONS

International Search Report for PCT/JP2020/015169 dated Jul. 7, 2020 [PCT/ISA/210].

(Continued)

*Primary Examiner* — Tran N Nguyen
*Assistant Examiner* — Masoud Vaziri
(74) *Attorney, Agent, or Firm* — Sughrue Mion, PLLC

(57) ABSTRACT

The rotating electrical machine disclosed in the present application provides a rotor shafts supported by bearings, a rotor attached to the rotor shaft and rotates with the rotor shaft, a stator that surrounds the rotor through a gap so that the rotor can rotate, a frame that surrounds the rotor and the stator, an outer circumference of the stator is attached to an inner circumference of the frame, and an annular member provided along the inner circumference of the frame to prevent foreign matter existing at the boundary part between the frame and the stator from moving to a region different from the boundary part, it prevents foreign matter generated in the manufacturing process of the rotating electrical machine, such as shavings of a frame, from being scattered inside the rotating electrical machine.

21 Claims, 13 Drawing Sheets

(56) References Cited

U.S. PATENT DOCUMENTS

| | | | |
|---|---|---|---|
| 2013/0342060 A1* | 12/2013 | Sibley | F16C 33/6696 |
| | | | 310/90 |
| 2016/0056677 A1* | 2/2016 | Ikuta | H02K 1/28 |
| | | | 310/216.016 |
| 2017/0313283 A1 | 11/2017 | Kojima et al. | |
| 2018/0093698 A1* | 4/2018 | Urimoto | H02K 15/0062 |
| 2019/0334400 A1* | 10/2019 | Gmuend | H02K 15/022 |
| 2020/0028403 A1* | 1/2020 | Francis | H01R 43/048 |

FOREIGN PATENT DOCUMENTS

| | | | |
|---|---|---|---|
| JP | 2004-309334 A | 11/2004 |
| JP | 2016-136829 A | 7/2016 |
| WO | 2016/076166 A1 | 5/2016 |
| WO | 2018/091318 A1 | 5/2018 |

OTHER PUBLICATIONS

Extended European Search Report dated Apr. 21, 2023, issued in European Application No. 20928760.6.
Japanese Office Action issued Jul. 11, 2023 in Application No. 2022-511459.

\* cited by examiner

ROTATING ELECTRICAL MACHINE

CROSS REFERENCE TO RELATED APPLICATIONS

This application is a National Stage of International Application No. PCT/JP2020/015169 filed Apr. 2, 2020.

TECHNICAL FIELD

The present application relates to a rotating electrical machine.

BACKGROUND ART

Conventionally, in a rotating electrical machine mounted in vehicle, the stator is press-fitted and fixed to the inner peripheral surface of the frame, and the rotor is mounted inside the stator. (For example, Patent Literature 1)
[Patent Literature 1] JP 2016-136829 A

DISCLOSURE OF INVENTION

Technical Problem

There is a demand for weight reduction in the rotating electrical machine mounted in vehicle in order to improve fuel efficiency. Further, it is often mounted and used in the engine room of a vehicle, and is required to have durability against temperature changes, vibrations. Further, since the space that can be mounted in the engine room is limited, the reduction of the radial dimension of the rotating electrical machine is required.

The stator of the rotating electrical machine is fixed to the inner peripheral surface of the frame, but in order to be fixed with a predetermined holding force, it is necessary to make the outer diameter of the stator larger than the inner diameter of the frame and tighten the stator with the frame. If the frame is made of aluminum-based material, the weight can be reduced at low cost, but since the stator is formed by laminating electromagnetic steel sheets, there is a step on the contact surface of the stator with the frame due to the lamination, when the stator is press-fitted into the frame when fixing the stator, the frame made of an aluminum-based material having low hardness is scraped, and there is a problem that shavings of the frame are scattered inside the rotating electrical machine or the frame is damaged. It is also possible to fix the stator to the frame by shrink fitting without pressing the stator directly into the frame, but in that case, there is a problem that the manufacturing cost increases due to the equipment costs.

The present application discloses a technique made in view of the above circumstances, and an object thereof is to prevent foreign matter generated in the manufacturing process of the rotating electrical machine, such as shavings of the frame, from being scattered inside the rotating electrical machine.

Solution to Problem

The rotating electrical machine disclosed in the present application provides a rotor shafts supported by bearings, a rotor attached to the rotor shaft and rotates with the rotor shaft, a stator that surrounds the rotor through a gap so that the rotor can rotate, a frame that surrounds the rotor and the stator, an outer circumference of the stator is attached to an inner circumference of the frame, and an annular member provided along the inner circumference of the frame to prevent foreign matter existing at the boundary part between the frame and the stator from moving to a region different from the boundary part.

Advantageous Effects of Invention

Since the rotating electrical machine disclosed in the present application provides a rotor shafts supported by bearings, a rotor attached to the rotor shaft and rotates with the rotor shaft, a stator that surrounds the rotor through a gap so that the rotor can rotate, a frame that surrounds the rotor and the stator, an outer circumference of the stator is attached to an inner circumference of the frame, and an annular member provided along the inner circumference of the frame to prevent foreign matter existing at the boundary part between the frame and the stator from moving to a region different from the boundary part, it is possible to prevent foreign matter generated in the manufacturing process of the rotating electrical machine, such as shavings of a frame, from being scattered inside the rotating electrical machine.

DESCRIPTION OF EMBODIMENTS

First Embodiment

Hereinafter, embodiments of the rotating electrical machine according to the present application will be described with reference to the drawings. Note that the rotating electrical machine of the present application is not limited to the following description, and can be appropriately modified without departing from the summary of the present application. In the following drawings, for easy understanding, the scales of the respective members may be different from the actual scales, and illustration of configurations not related to the features of the present application is omitted.

The rotating electrical machine according to the first embodiment of the present application will be described with reference to FIGS. 1 to 5.

Figure 1:
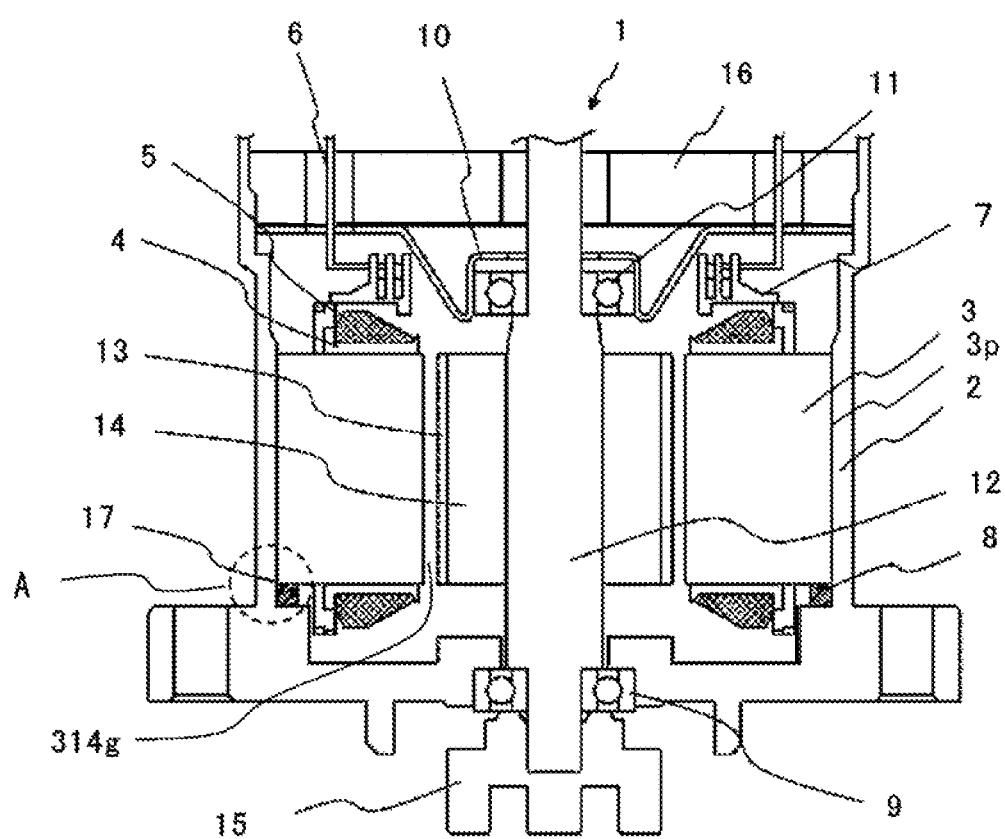
FIG. 1 is a cross-sectional view of a rotating electrical machine according to a first embodiment of the present application, in which a cross section of an annular member is hatched.
Figure 2:
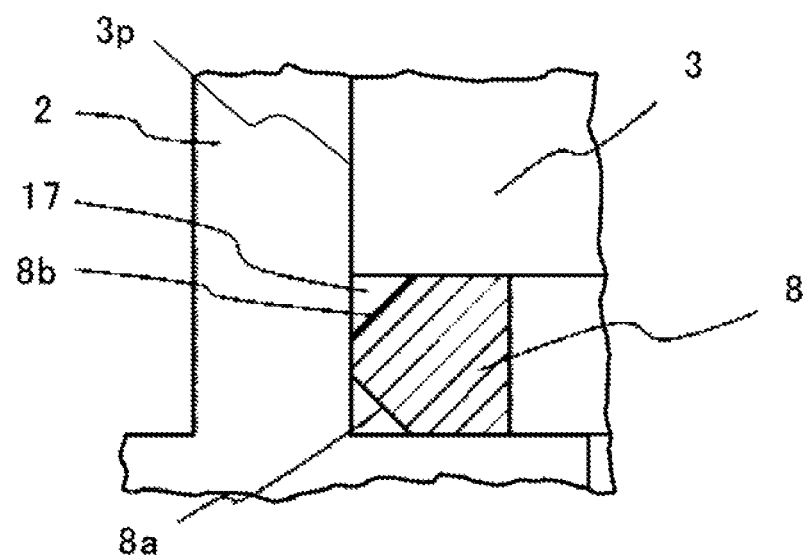
FIG. 2 is an enlarged view of part A in FIG. 1.

The first embodiment shows an example in which a rotating electrical machine is applied to an electric power steering mounted on a vehicle. A control device is required in addition to the rotating electrical machine to assist the steering force of the vehicle steering, but the illustration of the control device is omitted. FIG. 1 is a cross-sectional view of the configuration of a rotating electrical machine, and FIG. 2 is an enlarged view of part A in FIG. 1.

A frame 2 which is a housing of the rotating electrical machine 1 has a substantially cylindrical shape having an opening on the rear side (upper side of the drawing), and is made of an inexpensive and lightweight aluminum alloy. A stator 3 is formed by laminating electromagnetic steel sheets, a stator winding 5 is wound via an insulator 4 which is an electrical insulant, a terminal 6 for supplying an electric current to the stator winding 5 and a holder 7 for fixing the terminal 6 are installed.

Figure 3:
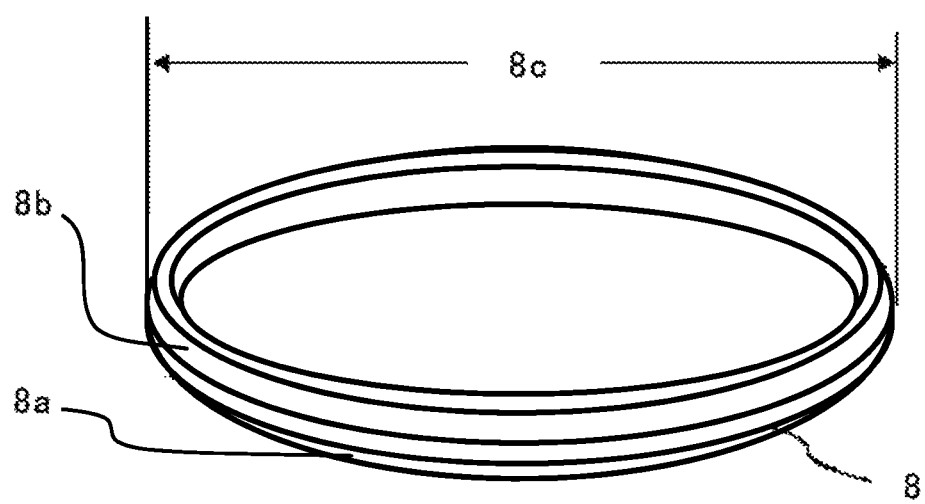
FIG. 3 is a perspective view of an annular member exemplified in FIGS. 1 and 2.

8 is an annular member, and is shown in a perspective view in FIG. 3. The annular member 8 has a lower hardness than the aluminum alloy used as the material of the frame 2, and is formed of polyacetal resin, or fluororesin, with an excellent wear resistance, the cross section being quadrangle shape thereof has a ring shape with chamfered parts 8a and 8b on the upper and lower edges on the outer peripheral side, an outer diameter 8c thereof is set to be larger than a hole diameter 2a of the frame 2 like an outer diameter 3a of the stator 3. As shown by the arrows in FIG. 4, the annular member 8 and the stator 3 are press-fitted in the order of the annular member 8 and the stator 3 from the opening on the rear side of the frame 2, the annular member 8 and the stator 3 are installed in contact with each other.

A bearing 9 is fixed to the frame 2 on the front side and a bearing 11 is fixed to the frame 2 via a bearing holder 10 made of carbon steel from the rear side.

A rotor 14 on which a magnet 13 is installed is fixed to a rotor shaft 12, and the rotor shaft 12 is rotatably supported by the bearing 9 and the bearing 11. The rotor 14 is configured to be separated from the stator 3 and surrounded by the rotor 14.

Further, a boss 15 for assembling with the vehicle side is installed at the end of the rotor shaft 12 in the front direction, a rotation angle detection sensor for detecting the rotational state of the rotor 14 is installed at an omitted part in the rear direction of the rotor shaft 12.

Here, 16 is a heat sink on which a control device (not shown) is installed, and the heat sink 16 is fixed to the rear opening portion of the frame 2. The control device includes a power conversion circuit having a power semiconductor that converts a direct current from the outside and a control circuit, and a required current is supplied to the stator winding 5 via the terminal 6. As a result, a rotational force is generated in the rotor 14, and the rotor shaft 12 and the boss 15 are rotated.

Figure 4:
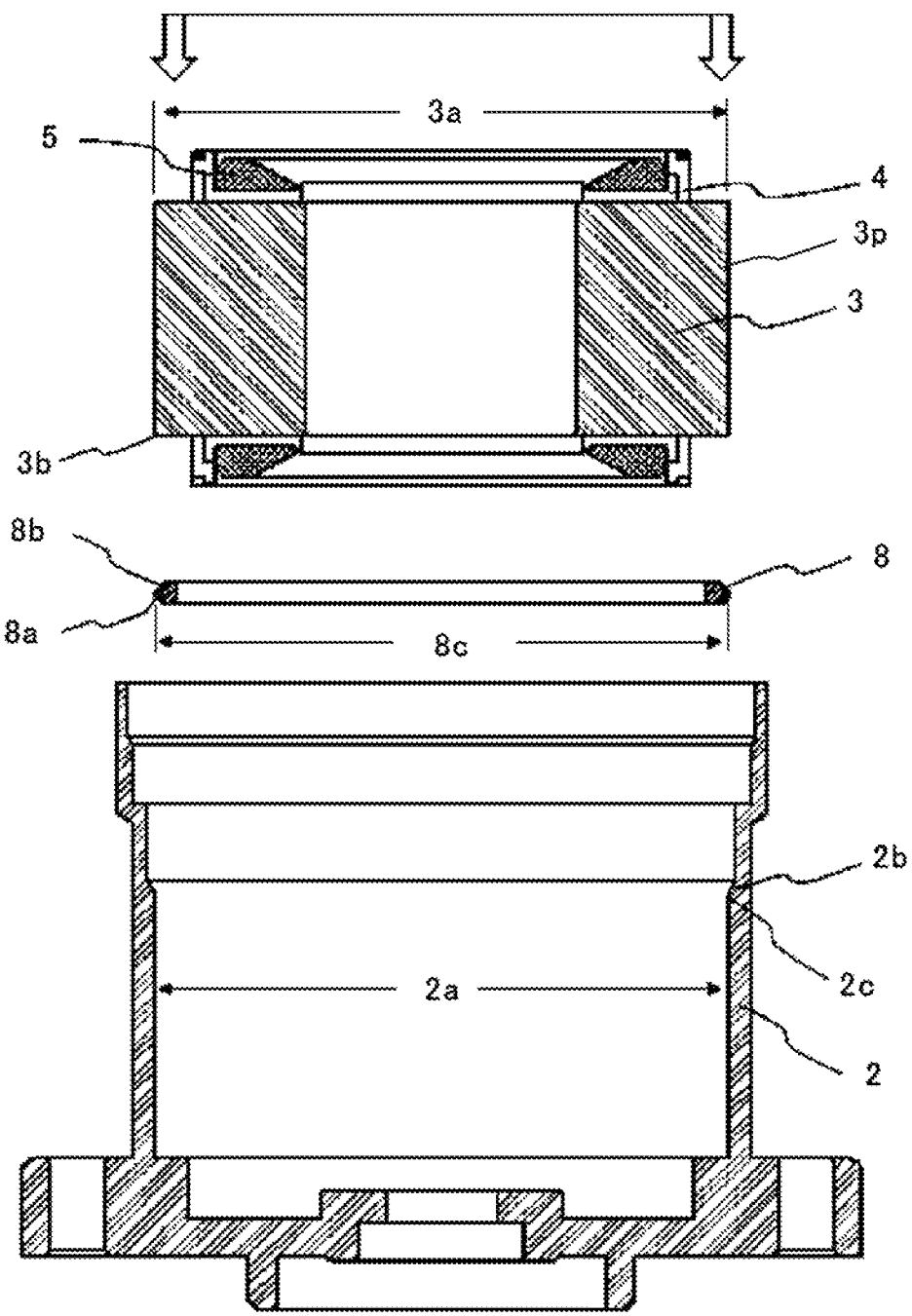
FIG. 4 is an explanatory view of an assembly process in the case of assembling a stator to a frame in the rotating electrical machine illustrated in FIGS. 1 to 3, and a cross section is displayed by hatching.

Next, the operation when the annular member 8 and the stator 3 are press-fitted into the frame 2 will be described with reference to FIG. 4. First, the annular member 8 and the stator 3 are set in the rear opening of the frame 2, by applying a load to the stator 3, it is guided to a chamfered part 8a of the annular member 8 and a press-fitting introduction taper 2b of the frame 2, the annular member 8 is press-fitted into the frame 2. Since the annular member 8 has a lower hardness than the frame 2, is flexible and has excellent wear resistance, the frame 2 is not scraped during the press-fitting process.

Next, an edge part 3b on the press-fitting tip side of the stator 3 is guided to the press-fitting introduction taper 2b of the frame 2, after that, by hitting a press-fitting introduction part edge 2c, the stress becomes excessive locally, thread burr-like shavings, in other words, foreign matter generated in the manufacturing process of the rotating electrical machine, are generated, it adheres to the edge portion 3b of the stator 3, or falls off into a space 17 surrounded by a chamfered part 8b of the annular member 8, the stator 3, and the frame 2.

Further, since the stator 3 is formed by laminating electromagnetic steel sheets, the contact surface with the frame 2 has a step due to the laminating, even during press-fitting, the frame 2 made of a low-hardness aluminum-based material is scraped off, it adheres to the edge part 3b of the stator 3, or falls off into the space 17 surrounded by the chamfered part 8b of the annular member 8, the stator 3, and the frame 2. These shavings do not come out of the sealed space 17 even if vibration or impact is applied.

If there is no annular member 8, the shavings move in the frame 2 due to vibration or impact. If it gets in between the stator 3 and the rotor 14 or in the bearings 9 and 11, normal rotation operation is hindered. Further, since the shavings, which are aluminum-based materials, have conductivity, there is a risk of short-circuiting if they adhere between conductive parts such as terminals 6. In the configuration of this embodiment, when the stator 3 is press-fitted into the frame 2, the shavings of the frame 2 are not scattered in the frame 2, and a highly reliable rotating electrical machine can be provided.

Next, in the present embodiment, the annular member 8 may be made of a porous resin such as a fluorine-based sponge, and the annular member 8 may be impregnated with a lubricant such as mineral oil or liquid paraffin. When the annular member 8 is press-fitted into the frame 2, the lubricant impregnated in the annular member 8 is uniformly applied to the press-fitting surfaces of the frame 2 and the stator 3, which makes it less likely to be abrased and can suppress the generation of shavings.

Figure 5:
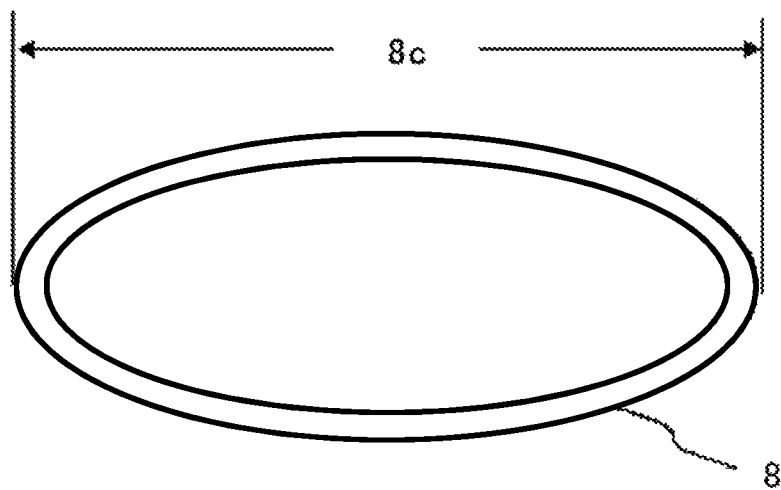
FIG. 5 is a perspective view showing another example of the annular member of the rotating electrical machine according to the first embodiment of the present application.

Further, in the present embodiment, the annular member 8 has a quadrangular cross section and has a ring shape having chamfered parts 8a and 8b at the upper and lower edge part on the outer peripheral side, the cross-sectional shape may be another shape as long as it is annular, such as one having an O-ring-shaped cross section as shown in the perspective view shown in FIG. 5.

By making the cross section of the annular member 8 circular or polygonal as illustrated in FIG. 2, an annular space 17 is formed which is surrounded by the annular member 8, the stator 3, and the frame 2 and extends over the entire inner circumference of the frame 2. The above-mentioned thread burr-like shavings, in other words, foreign substances generated in the manufacturing process of the rotating electrical machine, are held in the annular space 17 extending over the entire inner circumference of the frame 2, the foreign matter is transferred from the region of space 17 to a region other than the region of space 17, for example, it is prevented from moving to a gap 314g between the stator 3 and the rotor 14, the coil end part of the stator 3, and the regions such as the bearings 9 and 11.

Second Embodiment

Figure 6:
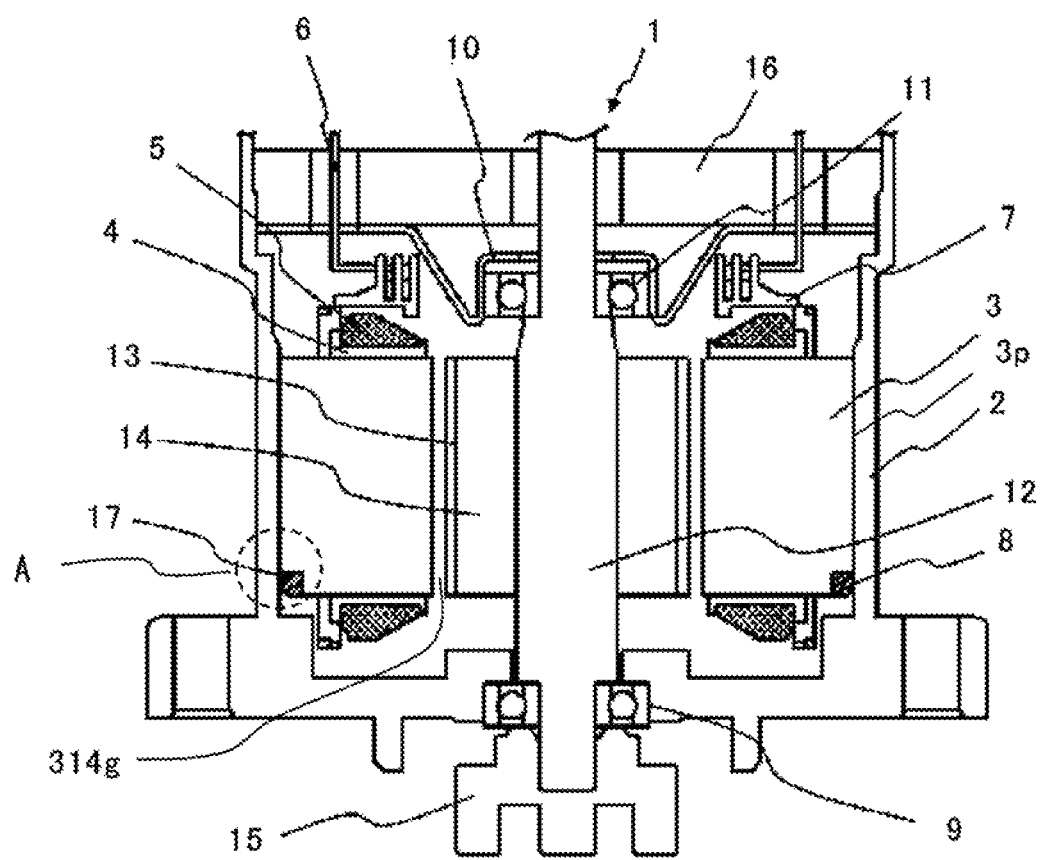
FIG. 6 is a cross-sectional view of a rotating electrical machine according to a second embodiment of the present application, in which a cross section of an annular member is hatched.
Figure 7:
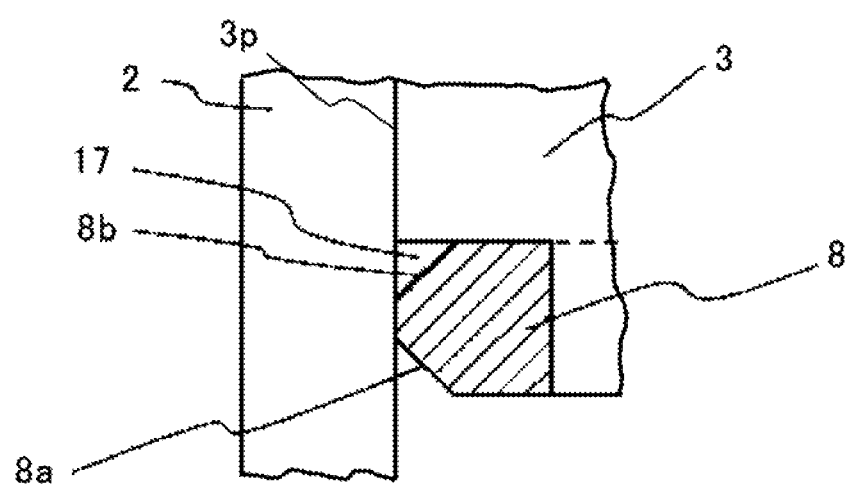
FIG. 7 is an enlarged view of part A in FIG. 6.
Figure 8:
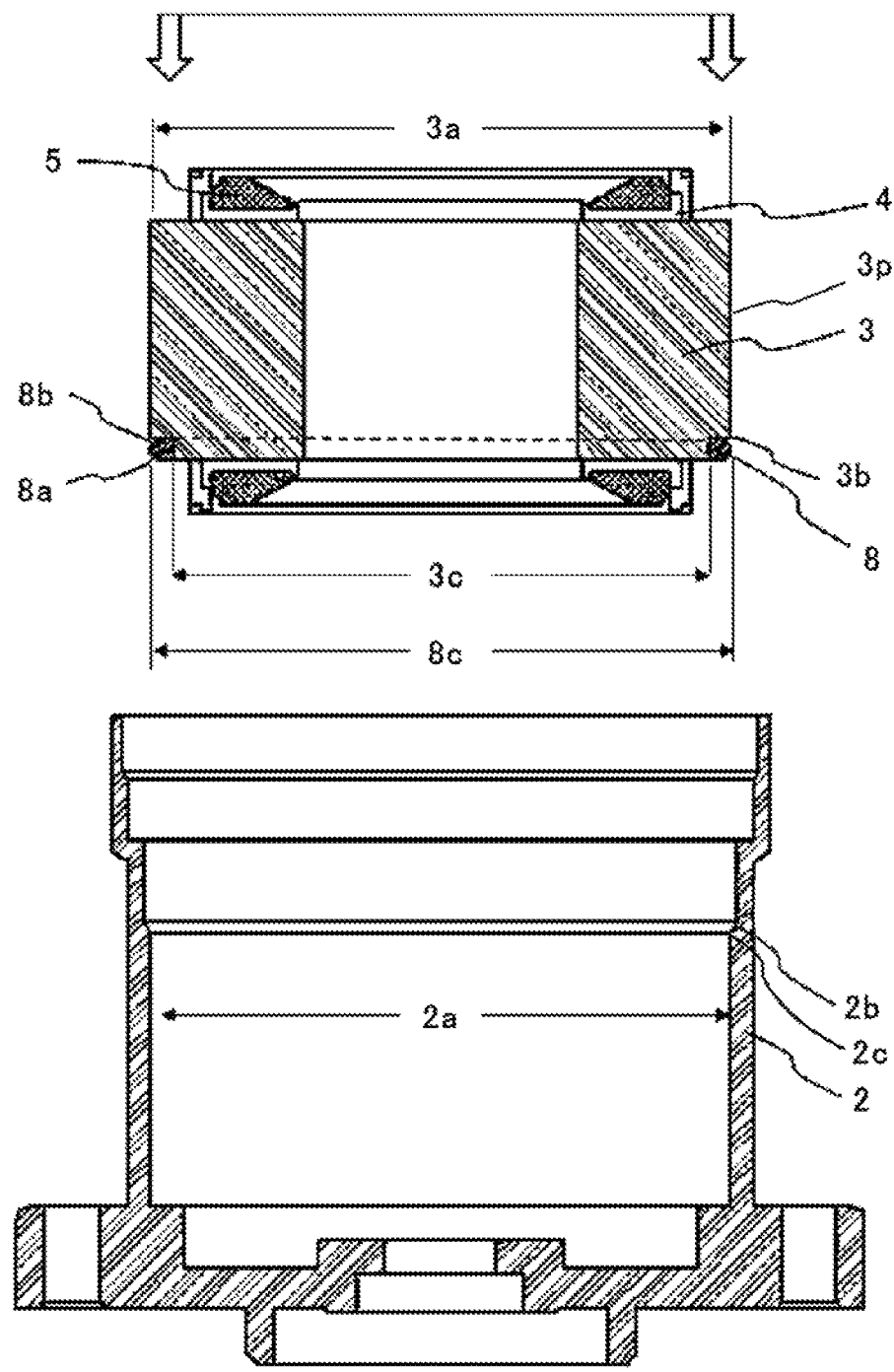
FIG. 8 is an explanatory view of an assembly process in the case of assembling a stator to a frame in the rotating electrical machine illustrated in FIGS. 5 to 7, and a cross section is displayed by hatching.

The rotating electrical machine according to the second embodiment of the present application will be described with reference to FIGS. 6 to 8. Similar to the first embodiment, the present embodiment shows an example in which a rotating electrical machine is applied to an electric power steering mounted on a vehicle. FIG. 6 is a cross-sectional view of the configuration of a rotating electrical machine according to the second embodiment, and FIG. 7 is an enlarged view of part A in FIG. 6. FIG. 8 is a diagram illustrating a press-fitting process.

In the first embodiment, the annular member 8 and the stator 3 are formed as separate bodies, and they are set in the rear opening of the frame 2 and press-fitted, in the second embodiment, the stator 3 and the annular member 8 are integrated and press-fitted.

In the figure, the stator 3 is formed by laminating electromagnetic steel sheets, and on the press-fitting tip side has a small diameter part 3c whose size is smaller than the outer diameter 3a, of the small diameter part 3c, an annular member 8 made of a polyacetal resin or a fluororesin having excellent wear resistance and having the hardness being lower than that of the aluminum alloy that is the material of the frame 2 is fixed or outsert molded to the small diameter part 3c.

The outer diameter 8c of the annular member 8 is set to be larger than the hole diameter 2a of the frame 2 like the outer diameter 3a of the stator 3, and is press-fitted into the frame 2 together with the stator 3.

Other configurations and operations are the same as in the first embodiment.

Since the annular member 8 is integrated with the stator 3, the workability of press fitting is good. Further, as in the first embodiment, the annular member 8 is made of a porous resin such as a fluorine-based sponge, even when the annular member 8 is impregnated with a lubricant such as mineral oil or liquid paraffin, the lubricant can be impregnated and press-fitted without touching the annular member 8, work efficiency is improved without polluting the work environment.

Third Embodiment

The rotating electrical machine according to the third embodiment of the present application will be described with reference to FIGS. 9 to 12. Similar to the first and second embodiments, the present embodiment shows an example in which a rotating electrical machine is applied to an electric power steering mounted on a vehicle.

Figure 9:
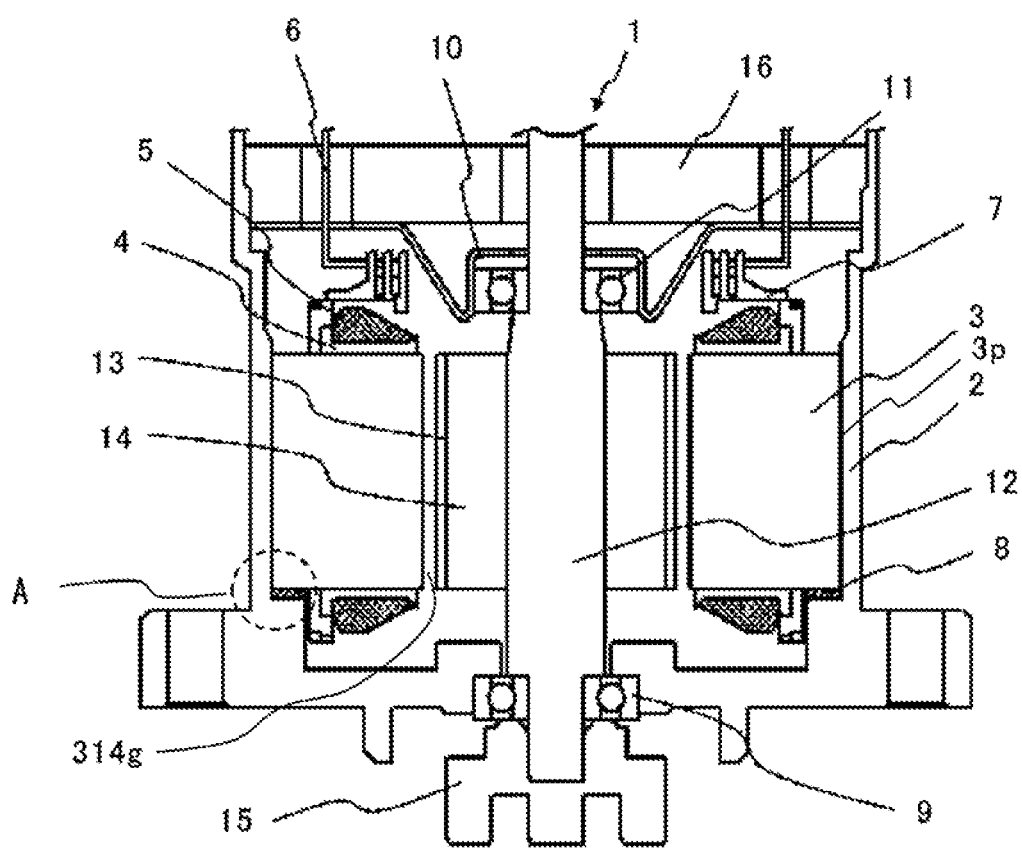
FIG. 9 is a cross-sectional view of a rotating electrical machine according to a third embodiment of the present application, in which a cross section of an annular member is hatched.
Figure 10:
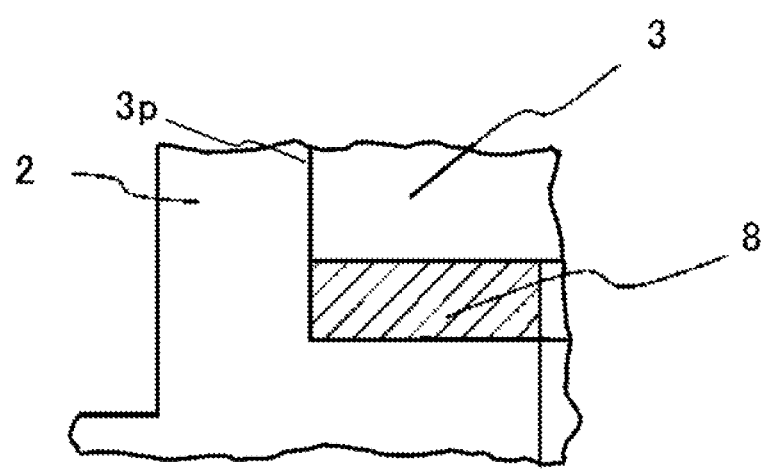
FIG. 10 is an enlarged view of part A in FIG. 9.
Figure 11:
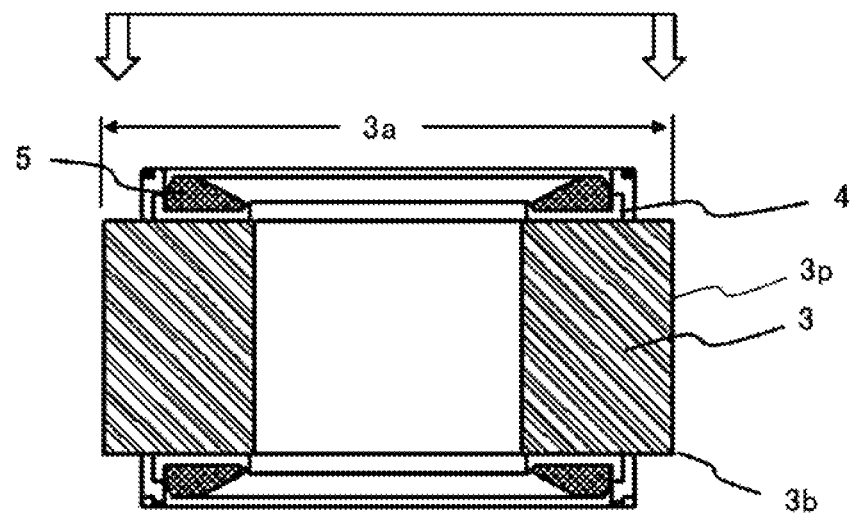
FIG. 11 is an explanatory view of an assembly process in the case of assembling a stator to a frame in the rotating electrical machine illustrated in FIGS. 9 and 10, and a cross section is displayed by hatching.
Figure 11:
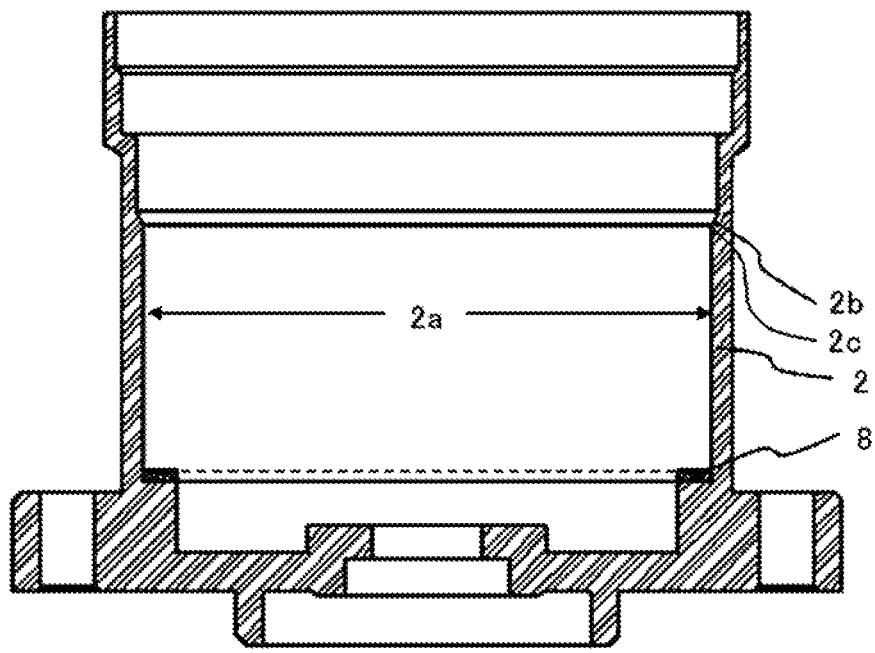

FIG. 9 is a cross-sectional view of the configuration of a rotating electrical machine according to the third embodiment, and FIG. 10 is an enlarged view of part A in FIG. 9. FIG. 11 is a diagram illustrating a press-fitting process.

Figure 12:
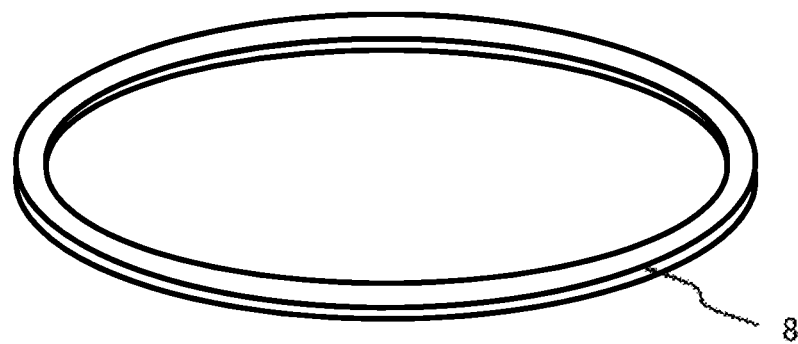
FIG. 12 is a perspective view of an annular member exemplified in FIGS. 9 and 10.

In FIGS. 9 to 12, the annular member 8 has a rectangular cross-section and a sheet shape as shown in the perspective view of FIG. 12, and is arranged on the frame 2. In this case, the annular member 8 does not necessarily have to be press-fitted into the frame 2. Further, the annular member 8 may be outsert molded on the frame 2. In this state, the stator 3 is press-fitted to come into contact with the annular member 8.

By using the annular member 8 as a material that is more flexible and elastic than an aluminum alloy such as resin, the annular member 8 can be brought into close contact with the stator 3 without a gap.

By forming the annular member 8 with a material having a Young's modulus lower than the aluminum alloy which is the material of the frame 2, in this case, the shavings adhering to the edge part 3b of the stator 3 and the shavings falling on the annular member 8 are sandwiched between the contact part between the annular member 8 and the stator 3 when the press-fitting of the stator 3 is completed, and are not scattered in the frame 2 even if vibration or impact is applied.

Further, by making a part or the whole of the annular member 8 adhesive, the shavings that have fallen off during the press-fitting process stick to the adhesive part of the annular member 8 and do not move, it is possible to prevent the shavings with more reliability from being scattered in the frame 2.

Fourth Embodiment

Figure 13:
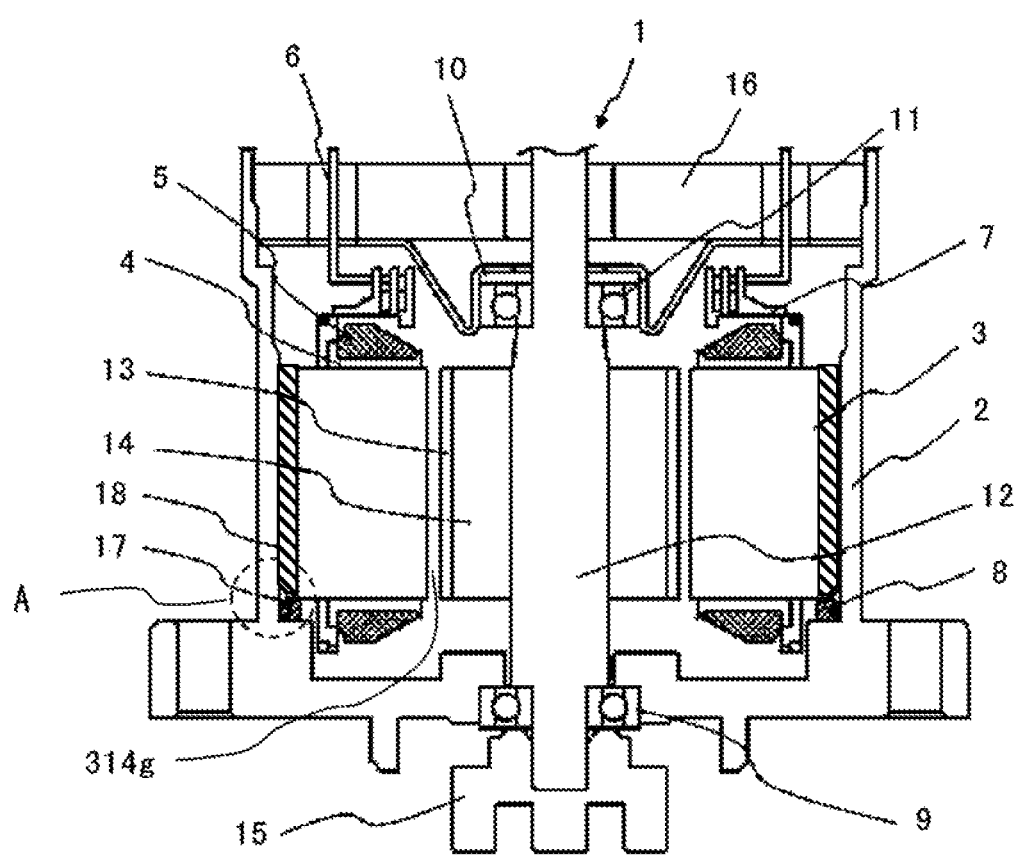
FIG. 13 is a cross-sectional view of a rotating electrical machine according to a fourth embodiment of the present application, in which a cross section of an annular member and a cross section of a thin-walled cylindrical member are hatched.
Figure 14:
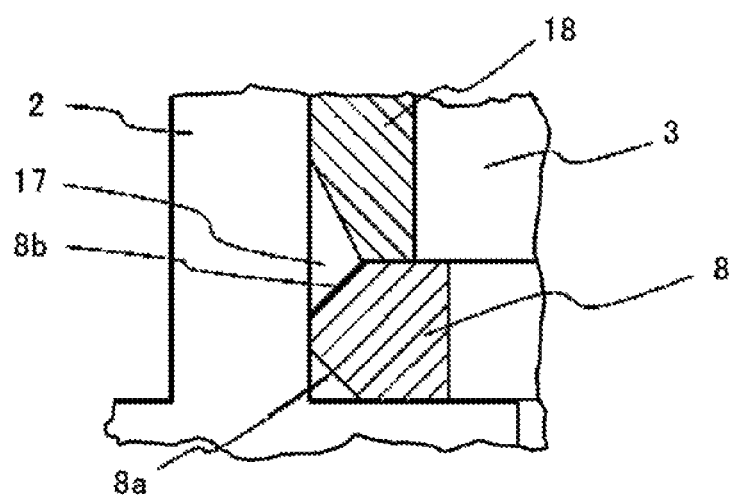
FIG. 14 is an enlarged view of part A in FIG. 13.
Figure 15:
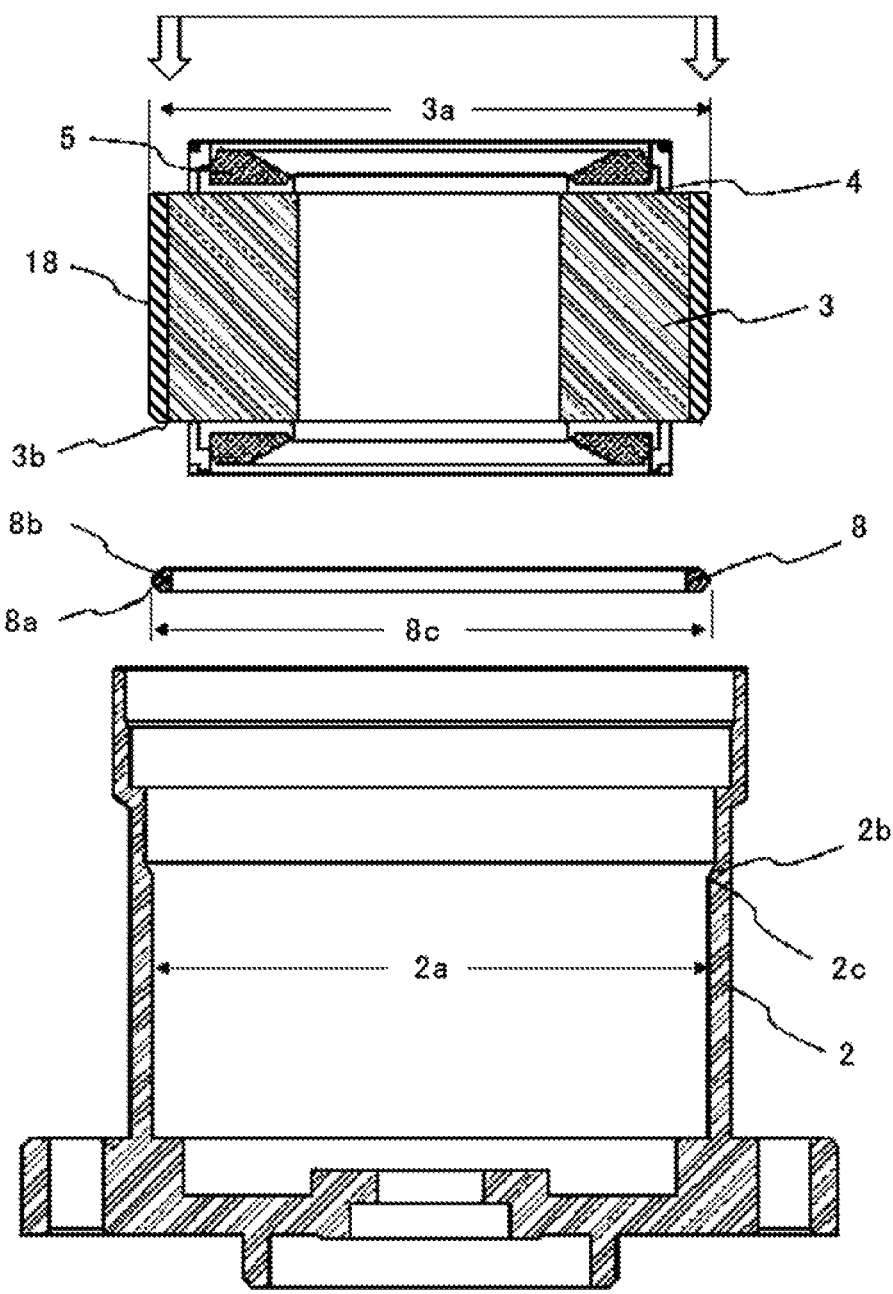
FIG. 15 is an explanatory view of an assembly process in the case of assembling a stator to a frame in the rotating electrical machine illustrated in FIGS. 13 and 14, and a cross section is displayed by hatching.

As described above, the configurations in which the stator 3 formed by laminating the electromagnetic steel sheets are directly press-fitted into the frame 2 have been described in the first to third embodiments, as in the fourth embodiment of the present application exemplified in FIGS. 13 to 15, the stator 3 may be applied to a stator 3 press-fitted and fixed to a thin-walled cylindrical member 18 made of carbon steel.

FIG. 14 is an enlarged view of part A in FIG. 13, and FIG. 15 is a diagram illustrating a press-fitting process.

As is clear from FIGS. 13, 14, and 15, in the case of the fourth embodiment, since the press-fitting surface in contact with the frame 2 has no step formed by laminating the electromagnetic steel sheets of the stator 3, it is possible to suppress the frame 2 from being scraped by press-fitting and to provide a more reliable rotating electrical machine.

The first to fourth embodiments of the present application generally have the following characteristic features.

Characteristic Feature 1

The rotating electrical machine provides a rotor shaft supported by bearings, a rotor attached to the rotor shaft and rotates with the rotor shaft, a stator that surrounds the rotor through a gap 314g so that the rotor can rotate, a frame that surrounds the rotor and the stator and has the inner circumference attached to the outer circumference of the stator, and an annular member in which the entire circumference of the outer circumference extends over the entire circumference of the inner circumference of the frame to prevent foreign matter existing in the part between the inner circumference of the frame and the outer circumference of the stator from moving to a region different from the intermediate part, the annular member is mounted on the front side of the stator, the stator is made of electromagnetic laminated steel plate, and the stator is press-fitted into the frame in the extending direction of the rotor shaft, the annular member is mounted to be located in front of a press-fitting part 3p of the stator in the press-fitting direction. In other word it is a rotating electrical machine equipped with a rotor shaft and rotor fixed to the rotor shaft, a stator formed by laminating electromagnetic laminated steel plates and disposed to surround the rotor, a stator winding wound around the stator, a frame that press-fits and holds the stator, and an annular member contact-mounted in front of the press-fitting part 3p of the stator in the press-fitting direction. Therefore, it is possible to prevent the shavings of the frame from being scattered inside the rotating electrical machine, and it is possible to prevent the shavings from hindering the rotation and short-circuiting the energization of the stator winding.

Characteristic Feature 2

Since the annular member is press-fitted into the frame, it is possible to prevent the shavings of the frame from being scattered inside the rotating electrical machine, and it is possible to prevent the shavings from hindering the rotation and short-circuiting the energization of the stator winding. Further, the cost of shrink fitting can be eliminated.

Characteristic Feature 3

Since the space surrounded by the annular member, the stator, and the frame is formed, it is possible to prevent the shavings of the frame with more reliability from being scattered inside the rotating electrical machine, and it is possible to prevent the shavings from hindering the rotation and short-circuiting the energization of the stator winding.

Characteristic Feature 4

Since the annular member is fixed to the stator and the annular member is integrated with the stator, press-fitting workability is good.

Characteristic Feature 5

Since the annular member is made of a material having a hardness lower than that of the frame, it is possible to prevent the shavings of the frame from being scattered inside the rotating electrical machine, and it is possible to prevent the shavings from hindering the rotation and short-circuiting the energization of the stator winding.

Characteristic Feature 6

Since the annular member is impregnated with a lubricant, the lubricant impregnated in the annular member is uniformly applied to the press-fitting surfaces of the frame and the stator, which makes it less likely to be abrased and can suppress the generation of shavings.

Characteristic Feature 7

Since the annular member is arranged on the frame and the annular member is fixed to the frame, when the press-fitting of the stator is completed, the shavings are sandwiched between the contact part between the annular member and the stator, and are not scattered in the frame even if vibration or impact is applied.

Characteristic Feature 8

Since the annular member is made of a material with a Young's modulus lower than the frame, by making the annular member a more flexible and elastic material than aluminum alloys such as resin, it can be in close contact with the stator without any gaps, and the shavings will be removed when the press-fitting of the stator is completed, it is sandwiched between the contact part between the annular member and the stator, and does not scatter in the frame even if vibration or impact is applied.

Characteristic Feature 9

Since part or all of the annular member has adhesiveness, in other words, since at least a part of the annular member has adhesiveness so that the annular member is adhered to at least one of the stator and the frame, by making the annular member sticky, the shavings that fell off during the press-fitting process stick to the annular member and did not move, and when the press-fitting of the stator was completed, the shavings are sandwiched between the contact part between the annular member and the stator, and does not scatter in the frame even if vibration or impact is applied.

Characteristic Feature 10

Since the stator is held around by a thin-walled cylindrical member, in other words, since the outer circumference of the stator is covered with a cylindrical member, and the stator is attached to the frame via the cylindrical member, since the press-fitting surface in contact with the frame has no step formed by laminating the electromagnetic steel sheets of the stator, it is possible to suppress the frame from being scraped by press-fitting and to provide a more reliable rotating electrical machine.

Characteristic Feature 11

The rotating electrical machine provides a rotor shaft supported by bearings, a rotor attached to the rotor shaft and rotates with the rotor shaft, a stator that surrounds the rotor through a gap 314g so that the rotor can rotate, a frame that surrounds the rotor and the stator and has the inner circumference attached to the outer circumference of the stator, and an annular member in which the entire circumference of the outer circumference extends over the entire circumference of the inner circumference of the frame to prevent foreign matter existing in the boundary portion between the inner circumference of the frame and the outer circumference of the stator from moving to a region different from the the boundary portion, residual foreign matter such as frame shavings generated in the manufacturing process and remaining at the boundary between the frame and the stator are prevented from moving during the process of manufacturing a rotating electrical machine, including the process of assembling the rotating electrical machine, in the process of assembling the rotating electrical machine to a vehicle including a two-wheeled vehicle, or during the vibration of the rotating electrical machine while the vehicle is in operation in regions different from the boundary part, for example, in a region such as a coil end part of the stator winding, a bearing, a gap between the rotor and the stator, it is possible to prevent unfavorable effects on the coil end, bearings or voids.

In the drawings, the same reference numerals indicate the same or corresponding parts.

Each embodiment can be appropriately modified and combined within the scope of the invention.

Although various exemplary embodiments and examples are described in this application, the various features, modes, and functions described in one or more embodiments are not limited to the application of a particular embodiment, but can be applied to embodiments alone or in various combinations.

Accordingly, countless variations not illustrated are envisioned within the scope of the art disclosed in this application. For example, this shall include cases where at least one component is transformed, added or omitted, and even where at least one component is extracted and combined with components of other embodiments.

REFERENCE SIGNS LIST

1: Rotating electrical machine
2: Frame
2a: Hole diameter
2b: Press-fitting introduction taper
2c: Press-fitting introduction part edge
3: Stator
3a: Outer diameter
3b: Edge part
3c: Small diameter part
3p: Press-fitting part
4: insulator
5: Stator winding
6: Terminal
7: Holder
8: Annular member
8a: Chamfered part
8b: Chamfered part
8c: Outer diameter
9: Bearing
10: Bearing holder
11: Bearing
12: Rotor shaft
13: Magnet
14: Rotor
15: Boss
16: Heat sink
17: Space
18: Thin-walled cylindrical member
314g: Gap

The invention claimed is:

1. A rotating electrical machine, comprising;
a rotor shaft supported by bearings,
a rotor attached to the rotor shaft and rotates with the rotor shaft,
a stator that surrounds the rotor through a gap so that the rotor can rotate,
a frame that surrounds the rotor and the stator, wherein, an outer circumference of the stator is attached to an inner circumference of the frame, and
an annular member provided along the inner circumference of the frame so that the entire circumference of the outer circumference of the annular member extends over the entire circumference of the inner circumference of the frame and contacts with the frame over the entire circumference of the inner circumference of the frame to prevent foreign matter existing at the boundary part between the frame and the stator from moving to a region different from the boundary part.

2. The rotating electrical machine according to claim 1, wherein;
the annular member is disposed on the front side of the stator.

3. The rotating electrical machine according to claim 1, wherein;
the stator is made of electromagnetic laminated steel plate,
the stator is press-fitted into the frame in the extending direction of the rotor shaft, and
the annular member is mounted to be located in front of the press-fitting part of the stator in the direction of the press-fitting.

4. The rotating electrical machine according to claim 2, wherein;
the stator is made of electromagnetic laminated steel plate,
the stator is press-fitted into the frame in the extending direction of the rotor shaft, and
the annular member is mounted to be located in front of the press-fitting part of the stator in the direction of the press-fitting.

5. The rotating electrical machine according to claim 1, wherein;
the annular member is press-fitted into the frame.

6. The rotating electrical machine according to claim 3, wherein;
the annular member is press-fitted into the frame.

7. The rotating electrical machine according to claim 1, wherein;
a space surrounded by the annular member, the stator, and the frame is formed.

8. The rotating electrical machine according to claim 6, wherein;
a space surrounded by the annular member, the stator, and the frame is formed.

9. The rotating electrical machine according to claim 1, wherein;
the annular member is fixed to the stator.

10. The rotating electrical machine according to claim 1, wherein;
the annular member is fixed to the frame.

11. The rotating electrical machine according to claim 3, wherein;
the annular member is fixed to the frame.

12. The rotating electrical machine according to claim 1, wherein;
the hardness of the annular member is lower than the hardness of the frame.

13. The rotating electrical machine according to claim 9, wherein;
the hardness of the annular member is lower than the hardness of the frame.

14. The rotating electrical machine according to claim 11, wherein;
the hardness of the annular member is lower than the hardness of the frame.

15. The rotating electrical machine according to claim 9, wherein;
the annular member is impregnated with a lubricant.

16. The rotating electrical machine according to claim 10, wherein;
the annular member is impregnated with a lubricant.

17. The rotating electrical machine according to claim 1, wherein;
the annular member is made of a material having a Young's modulus lower than the frame.

18. The rotating electrical machine according to claim 3, wherein;
the annular member is made of a material having a Young's modulus lower than the frame.

19. The rotating electrical machine according to claim 3, wherein;

at least a part of the annular member has adhesiveness so that the annular member is adhered to at least one of the stator and the frame.

20. The rotating electrical machine according to claim 3, wherein;

the stator is attached to the frame via the cylindrical member.

21. The rotating electrical machine according to claim 1, wherein;

the annular member is a ring-shaped member with the same cross-sectional shape at each circumferential position.

* * * * *